United States Patent
Ramchandani et al.

(10) Patent No.: US 6,486,893 B1
(45) Date of Patent: Nov. 26, 2002

(54) PROPERTY BROWSER WHICH DISPLAYS PROPERTIES OF SUB-OBJECTS IN AN ACTIVE X CONTROL

(75) Inventors: Mahesh Ramchandani, Austin, TX (US); Jeffrey D. Washington, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/504,412

(22) Filed: Feb. 15, 2000

(51) Int. Cl.7 .............................. G06F 3/00; G06F 9/44
(52) U.S. Cl. .................. 345/762; 345/853; 345/763; 717/113
(58) Field of Search ................... 345/762, 853, 345/854, 765, 967, 966, 763, 764, 781, 806, 788.846, 835, 826; 709/315, 316, 328; 717/113, 110, 116, 121; 707/101, 102, 103 R, 103 Y

(56) References Cited

U.S. PATENT DOCUMENTS 5,347,629 A  *  9/1994  Barrett et al. ............... 345/762
5,487,141 A  *  1/1996  Cain et al. ................... 345/764
5,689,662 A  * 11/1997  Nakajima et al. ........... 345/765
5,842,020 A  * 11/1998  Faustini ................... 345/967 X
5,870,088 A      2/1999  Wahington et al. ......... 345/781
6,035,301 A  *  3/2000  Siegel et al. ................. 707/102
6,247,020 B1 *  6/2001  Minard ................... 345/854 X

* cited by examiner

Primary Examiner—Raymond J. Bayerl
(74) Attorney, Agent, or Firm—Conley, Rose & Tayon PC; Jeffrey C. Hood

(57) ABSTRACT

A system and method for enabling a property browser to display properties of sub-objects of a control, such as an ActiveX control. The system and method further enables a user to manipulate properties of sub-objects of the control. The method determines the top level interface of the control and displays the top level properties at the top level interface in a property browser. The property browser also displays an indication of properties which are sub-objects, i.e., properties which themselves have properties. This indicator is typically a conventional plus sign which indicates further elements are available in a hierarchy tree of elements. When the user subsequently selects a property which is a sub-object, the method operates to read the interface of the sub-object property from the type library and then display further top level properties of the interface as necessary.

40 Claims, 9 Drawing Sheets

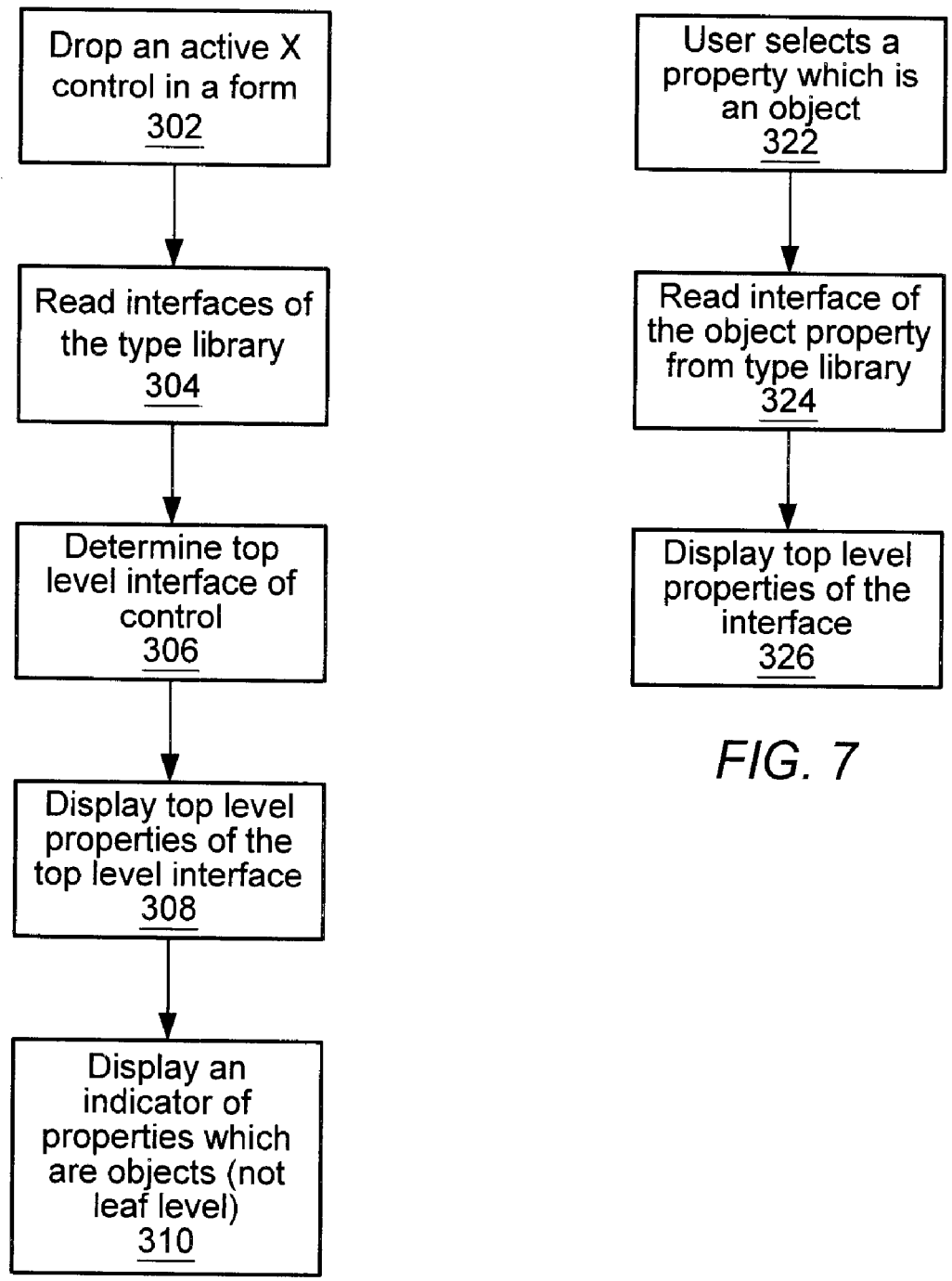

```
interface ICWSlide
{
properties:
        long        BackColor
        string      Caption
        ICWAxis     Axis
        boolean     Enabled
        ...
}
```
802

```
interface ICWAxis
{
properties:
        boolean     Autoscale
        string      Caption
        boolean     Discrete
        ICWLabels   Labels
        ...
}
```
804

FIG. 8

PROPERTY BROWSER WHICH DISPLAYS PROPERTIES OF SUB-OBJECTS IN AN ACTIVE X CONTROL

BACKGROUND OF THE INVENTION

1. Field of the Invention

The present invention relates to the field of graphical and non-graphical software controls, and more particularly to a property browser that displays and allows editing of properties of sub-objects in an Active X control.

2. Description of the Related Art

Graphical software controls or components have become commonplace in the field of user interfaces to computer programs, particularly software applications which make use of a graphical user interface (GUI). Examples of controls are list boxes, option buttons, scroll bars, check boxes, text boxes, picture boxes, command boxes, meters, gauges, charts, spread sheet displays, etc. The controls are commonly an integral part of the user interface to "Microsoft Windows" software applications, for example. The controls are used to receive user input and to display output. Additionally, controls can be created for non-user interface components such as timers, interfaces to hardware, data acquisition, and other software implementable functions.

Controls are used in a plethora of software applications. An example of an area in which software applications use controls is in the field of software controlled a instrumentation systems. It is common in the field of instrumentation systems for users to interact with instruments via software front panel interfaces rather than through hardware front panels. The instrumentation software programs commonly employ graphical controls such as switches, buttons, knobs, dials, meters, graphs, slider controls, slider indicators, etc. similar to those found on hardware front panels.

Programming systems such as "Visual Basic" provide an environment for software application developers to create user interfaces including controls. Typically, programming environments provide a set of standard controls. FIG. 1 is a screen shot of a Visual Basic 6.0 screen. Visual Basic 6.0 provides a toolbox of standard controls.

ActiveX Controls, also referred to as Object Linking and Embedding (OLE) Controls, are software components that conform to the Component Object Model (COM), a standard defined by "Microsoft". In many ways, ActiveX controls are similar to traditional libraries. However, since the standard is well defined, there are many applications that can use any ActiveX control simply by providing support for the ActiveX standard.

Applications or programming environments which support ActiveX controls, i.e., which may incorporate and use ActiveX controls, are commonly referred to as "ActiveX Control Containers" or simply "containers". Broadly speaking, a container is a software entity which "holds" or incorporates software components. Examples of containers are Microsoft's "Excel" spreadsheet product, "Word" word processor, "Access" database product, and Visual Basic programming environment. The ActiveX standard affords software application developers the opportunity to develop modular ActiveX controls to add into and use in their software applications.

Controls are typically objects or have some aspects of objects. Therefore, each control may have its own set of methods, events and properties. A method is a function which acts on a particular control. For example, a control may possess a "move" method to move the control around on a display screen. An event is an action recognized by a control, such as clicking a mouse or pressing a key. A control has associated code which executes in response to an event recognized by the control. Properties are the control's data (settings or attributes), such as color, shape or size. The properties of a control may be edited, i.e., changed to create the desired user interface.

Controls may have custom properties that are specific to the control. For example, a gauge may have the properties StartAngle and EndAngle describing the range in which the needle may be positioned. A button may have the properties OnColor, and OffColor for two different states. The ability to have custom properties, which the ActiveX standard provides, is generally more desirable than a standard which restricts properties on a component to a predefined set such as minimum, maximum, and color. However, this ability also presents a challenge to development systems that use the controls. Since each control may have its own unique properties, it is difficult for containers to present the custom properties of the controls to the user for configuration. This is where other attempts at control standards, such as the .VBX standard, have not been as successful as the ActiveX control standard.

Some properties of objects are themselves objects, referred to as sub-objects, which have their own properties. These properties of sub-objects may themselves be sub-objects that have their own properties, and so on.

ActiveX controls include a type library which specifies the interface of the control. The type library provides information about the components in the file (exe or dll) in which they are packaged. The type library is a compiled binary form of the idl (Interface Definition Language) file that defines the types (interfaces and controls) implemented.

FIG. 2 is a screen shot that shows an instance of a slider control which has been dragged from the toolbox and dropped onto the Form 1. The commonly used term "drop" is meant to encompass the placing of the control on the form, typically by clicking a mouse on the icon of the control in a toolbox, dragging the control from the toolbox to the form via the mouse and then releasing the mouse button to "drop" the control on the form. However, the present invention is not intended to be limited with respect to other manners of placing the control.

The slider has associated properties, which are listed in the Properties window. The developer changes the properties by selecting a property field, such as "Max" (which is set to 10 in FIG. 2), and changing the value. The control reflects the change when the developer enters the change into the Properties window.

FIG. 3 is a screen shot that shows a Slider Control Properties page dialog in which the developer changes the properties of the slider. FIG. 4 shows the Max tick value property changed from 10 to 20, which is reflected in the slider now having 20 tick marks, rather than 10.

As shown in FIG. 3, a control developer may implement property pages in the control. However they may not be implemented in every control. Hence the only guaranteed way to edit the properties in a control is by using the property browser provided by the development environment. However, the property browser for ActiveX controls on present ActiveX containers in the market are unable to display properties of sub-objects of ActiveX controls.

Some environments have a property browser which can be used to view and set properties of sub-objects. However, these methods rely on examination of the source code of the component to allow this function. These methods could not work for ActiveX controls, since the source code of an ActiveX control is not available. No property browser currently exists which is able to display the sub-objects of ActiveX controls. This is because ActiveX controls typically do not expose their source code, but rather include type libraries that expose the interface of the control. Current property browsers do not access the interface description of an object in the type library and therefore cannot enumerate all the properties implemented by the object, in particular, property browsers cannot access properties of sub-objects of the object. In addition, numerous difficulties are presented in implementing such a property browser.

Hence, a system and method is desired for allowing a user to view and manipulate properties of sub-objects in a property browser for an ActiveX control.

SUMMARY OF THE INVENTION

The present invention comprises a novel system and method for enabling a property browser to display properties of sub-objects of a control, such as an ActiveX control, which utilizes a type library or other similar mechanism for specifying the interface of a control. The system and method further enables a user to manipulate properties of sub-objects of the control.

The method comprises a user dragging an icon representation of the control and dropping the control onto a form of a container which contains controls, such as ActiveX controls. When the user drops the control, the container constructs the control. Also, the method operates to read the interfaces of the type library associated with the control.

The method then determines the top level interface of the control and displays the top level properties at the top level interface in a property browser. The property browser also displays an indication of properties which are sub-objects, i.e., properties which themselves have properties. This indicator is typically a conventional plus sign which indicates further elements are available in a hierarchy tree of elements.

When the user subsequently selects a property which is a sub-object, the method operates to read the interface of the sub-object property from the type library and then display further top level properties of the interface as necessary. Thus, the system and method of the present invention operate to enable the property browser to display properties of sub-objects of a control, such as an ActiveX control, and further enables the user to manipulate these properties of sub-objects of a control.

BRIEF DESCRIPTION OF THE DRAWINGS

A better understanding of the present invention can be obtained when the following detailed description of the preferred embodiment is considered in conjunction with the following drawings, in which:

FIG. 6 is a flowchart illustrating operation of the property browser according to the present invention;

FIG. 7 is a flowchart illustrating operation of the property browser when a user selects a property which is a sub-object;

FIG. 8 is a flowchart illustrating interfaces in a type library in pseudo-IDL according to one embodiment;

DETAILED DESCRIPTION OF THE PREFERRED EMBODIMENT

Incorporation by Reference

The following references are hereby incorporated by reference.

For general information on object oriented programming concepts, please see Booch, Object-Oriented Analysis and Design with Applications, The Benjamin/Cummings Publishing Company, Inc., 1994 which is hereby incorporated by reference in its entirety. For information on OLE Controls and COM interfaces, please see Microsoft OLE Control Developer's Kit, Microsoft Press, 1994 and Denning, OLE Controls Inside Out: The Programmer's Guide to Building Componentware with OLE and the Component Object Model, Microsoft Press, 1995 which are hereby incorporated by reference in their entirety.

Figure 1:
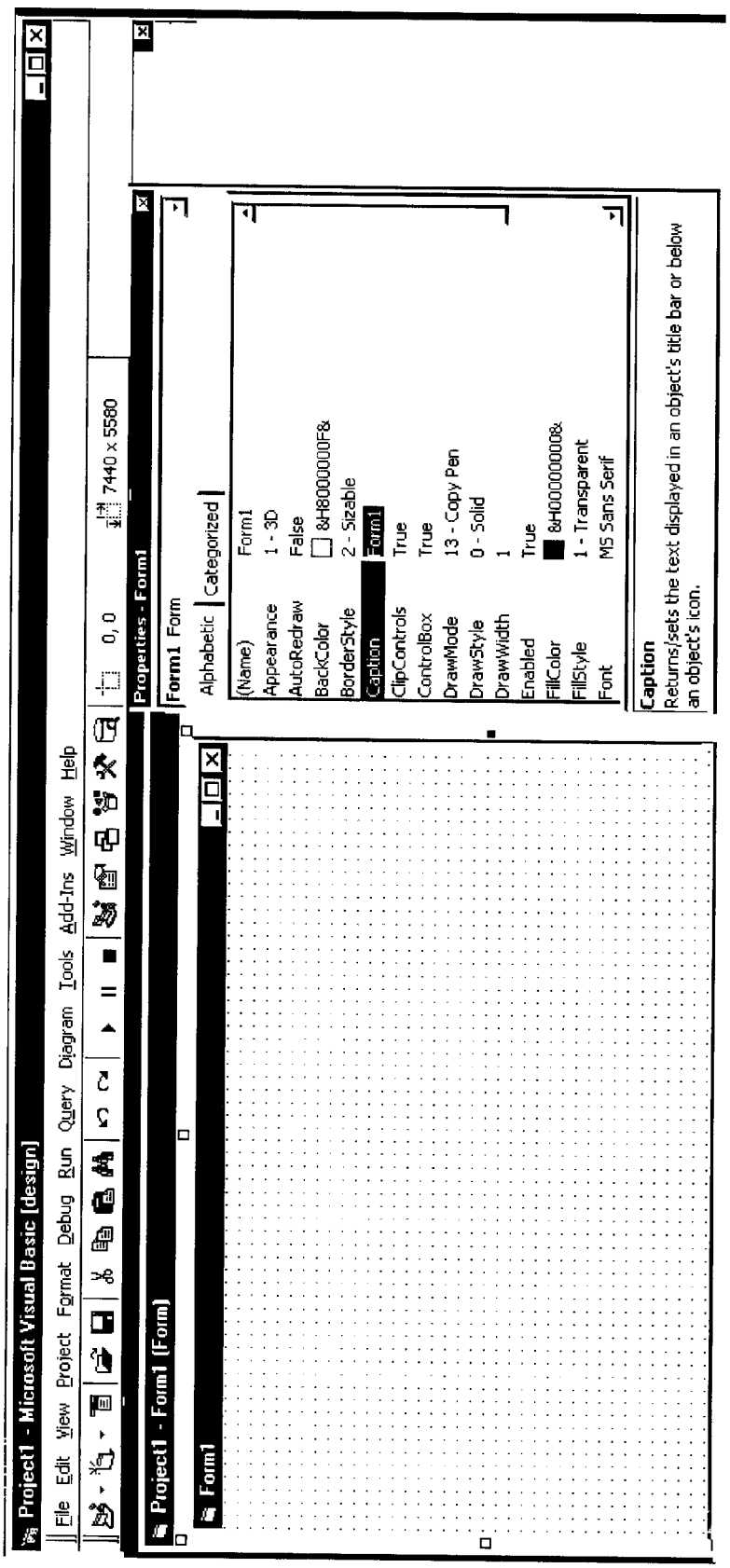
FIG. 1 is a screen shot of a Visual Basic 6.0 screen with a toolbar of icons of controls according to the prior art.
Figure 2:
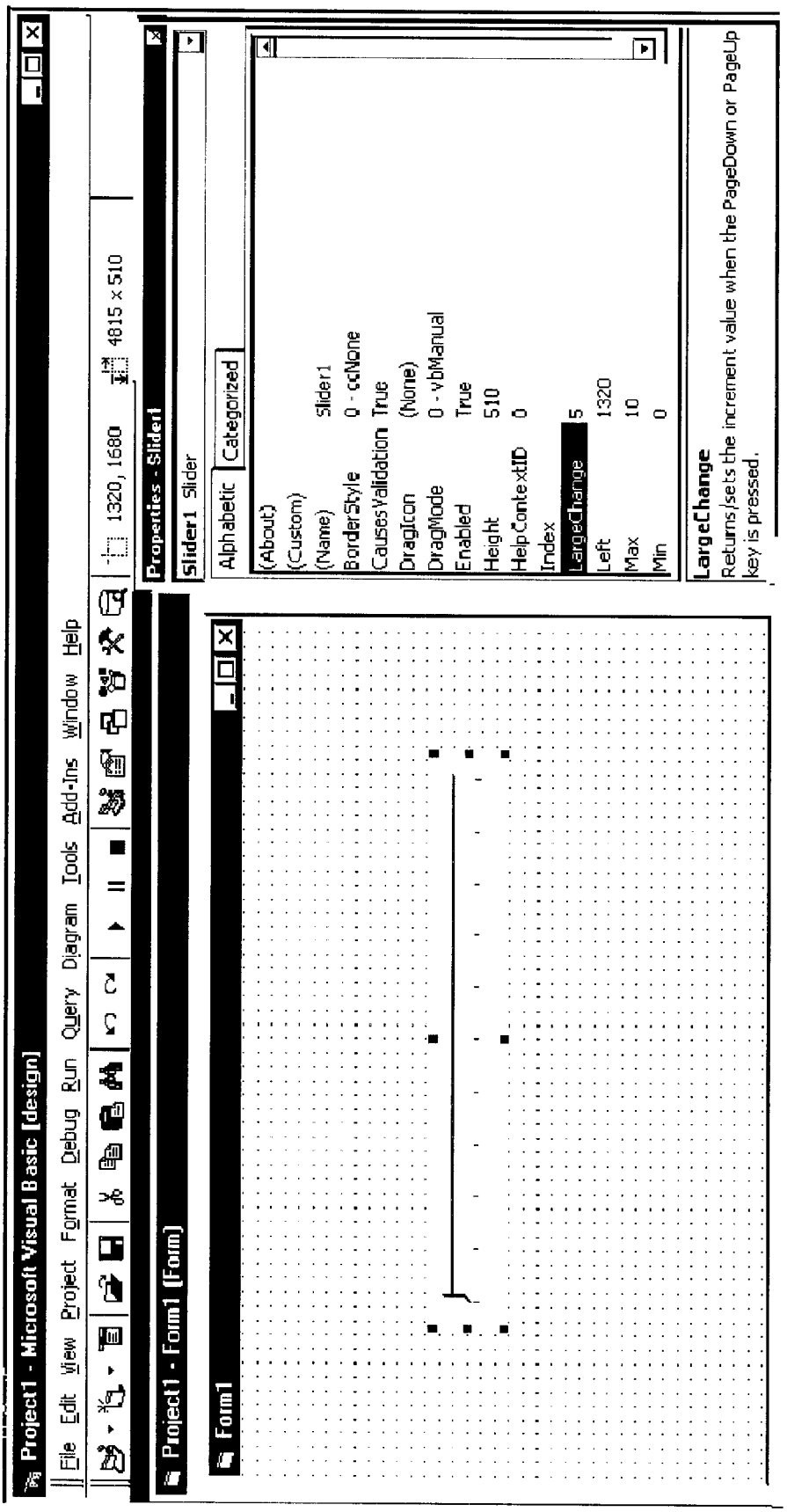
FIG. 2 is a screen shot showing a slider control from the toolbar of FIG. 1 according to the prior art.
Figure 3:
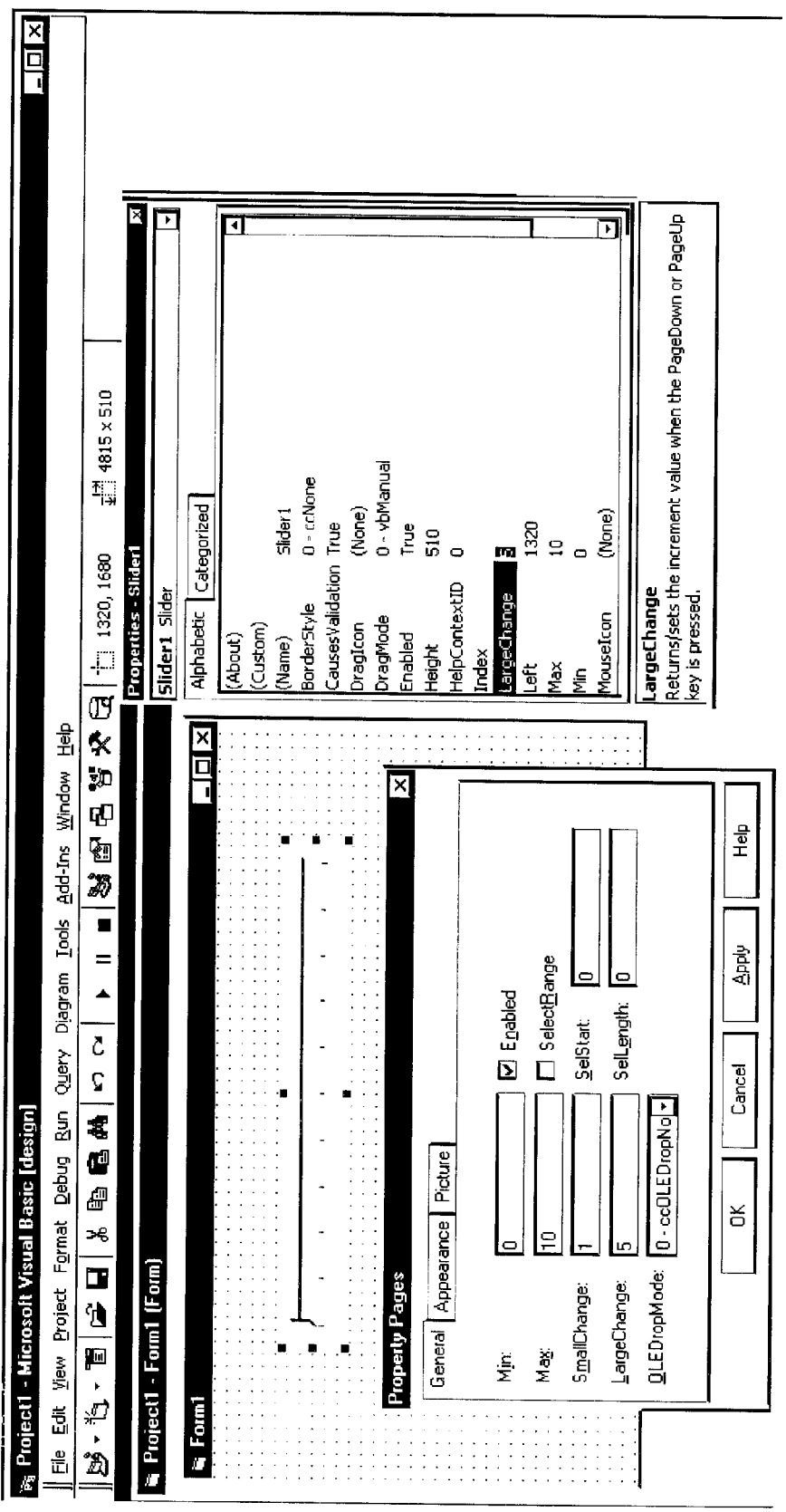
FIG. 3 is a screen shot showing the slider control of FIG. 2 property page dialog according to the prior art.
Figure 4:
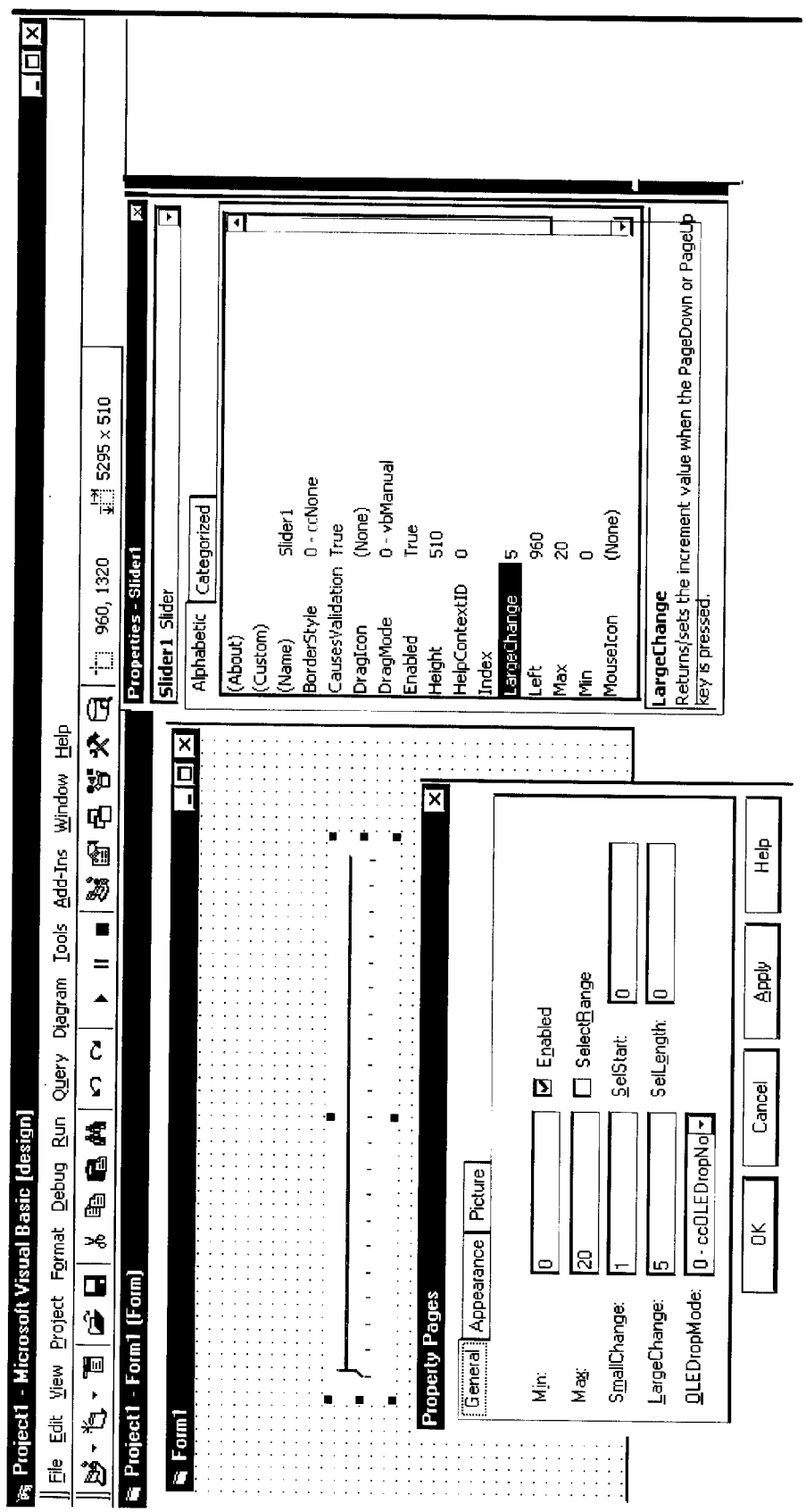
FIG. 4 is a screen shot showing the slider control of FIG. 3 being edited according to the prior art.
Figure 5:
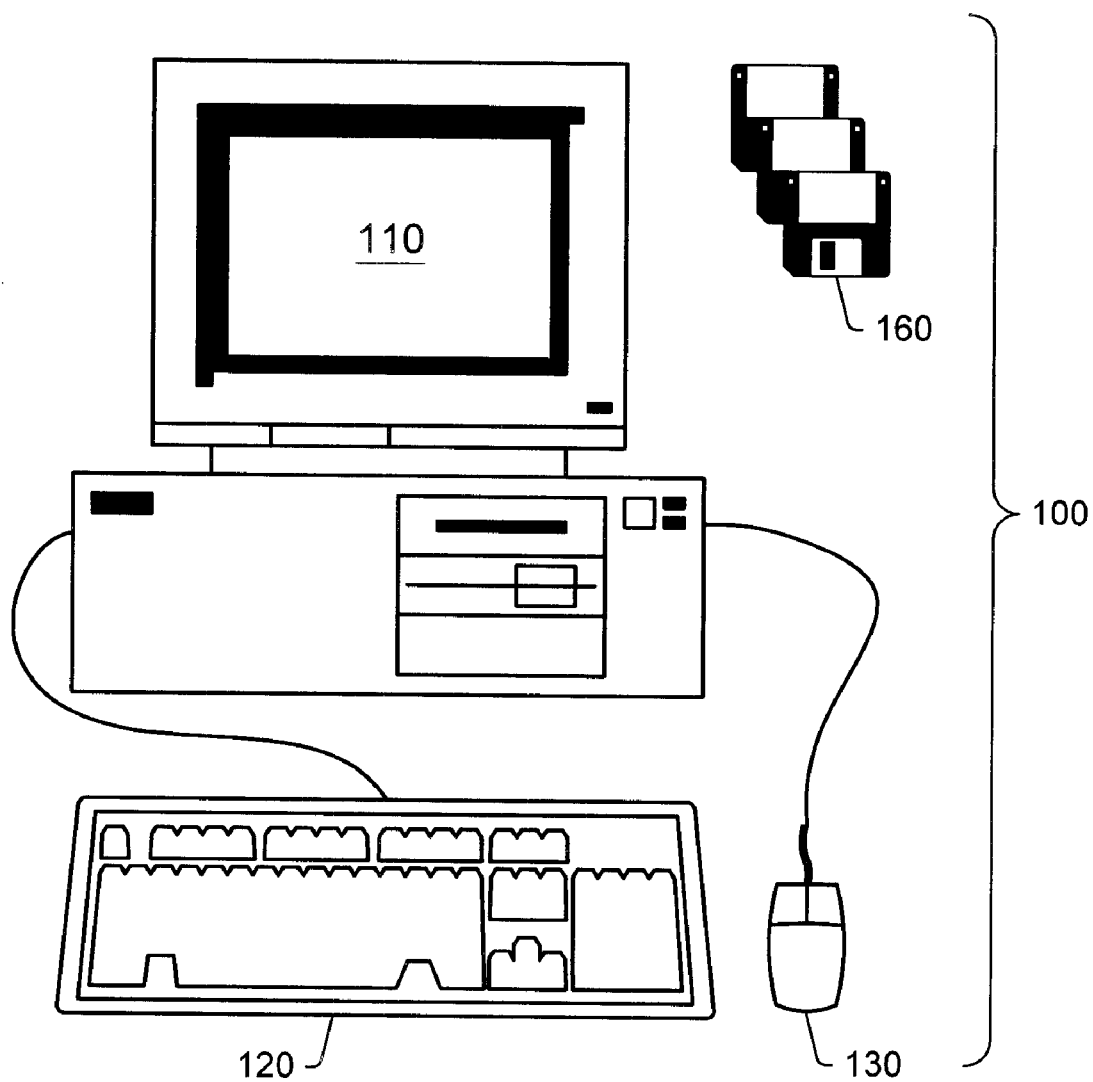
FIG. 5 is an illustrative computer system which is programmed according to the present invention and which operates according to the present invention.

FIG. 5 illustrates an exemplary computer system 100 which is programmed according to one embodiment of the present invention and which operates according to one embodiment of the present invention. The computer system 100 may comprise a display screen 110, a keyboard 120, and a mouse 130 as shown. The computer system 100 may also include various standard components, including at least one central processing unit (CPU), memory, a hard drive, one or more buses, and a power supply.

Referring again to FIG. 5, the computer system 100 preferably includes a memory medium on which computer programs according to the present invention are stored. The term "memory medium" is intended to include various types of memory or storage, including an installation medium, e.g., a CD-ROM, or floppy disks 160, a computer system memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer system 100 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software program for manipulating ActiveX controls in a computer system. The software program may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host CPU, executing code and data from the memory medium comprises a means for creating and executing the software program according to the methods or flowcharts described below.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

FIG. 6 is a flowchart illustrating steps performed to use and manipulate an ActiveX control according to one embodiment of the present invention.

In step 302 a user drops a standard ActiveX control onto a window or form of a container. An example of the window is a Visual Basic form. The user typically is a software developer desiring to create an application employing a graphical user interface. The application thus developed, which may be created and edited using the present invention, is then used by other users needing the application.

The ActiveX control interface is preferably the interface defined by the Microsoft ActiveX (OLE) Control Specification. Controls which conform to the ActiveX Control Specification are referred to as ActiveX controls, and are also referred to as OLE controls. It is noted that the present invention may be used with other control or component standards which utilize a type library.

The control dropped in step 302 is preferably embodied within the "National Instruments Componentworks" Controls, which are ActiveX controls. The ComponentWorks Controls are described herein being used by the Microsoft Visual Basic development environment container. However, the ComponentWorks controls described may be employed in, but not limited to, the following list of containers: Microsoft Visual FoxPro, Microsoft Access, Borland Delphi, Microsoft Visual C++, Borland C++, Microsoft Internet Explorer, Netscape Navigator, Microsoft Internet Developer Studio, National Instruments HiQ, and any other container which supports the ActiveX control specification.

The ComponentWorks Controls are preferably implemented in the C++ language using object oriented programming techniques. The controls are implemented as objects and as such have associated properties, methods and events. The control objects have associated constructors and destructors. A constructor is a method of a class which instantiates, or creates, an object of the class and/or initializes the state of the object. Common operations of the constructor include allocating memory for the object and invoking functions upon creation of the object which need to be performed at the time of the creation of the object. The terms construct, create and instantiate have substantially the same meaning in the context of this disclosure. A destructor is a method that frees the state of an object and/or destroys the object itself A destructor then, serves essentially the opposite function of a constructor. C++ provides the "new" operator to create an object and the "delete" operator to destroy an object. Objects and their common operations such as properties, methods, events, creation, and destruction are well known in the art of object oriented programming.

Referring again to FIG. 6, when the user drops the control, the container instantiates, i.e., creates or constructs, an object of the class defining the ActiveX control. Objects being instances of a class is well known in the art of object oriented programming.

After instantiating the ActiveX control object, the container invokes a method on the control to display the control on the container form. This operates to invoke a display method on the ActiveX control object. The user may subsequently drop other controls onto the form to create the desired user interface.

In step 304 the property browser reads the interfaces of the type library of the ActiveX control.

In step 306 the property browser determines the top level properties of the ActiveX control through the reading of the interfaces of the type library of the ActiveX control. A top level property that is a sub-object of the ActiveX control also has an interface in the type library which exposes the sub-object's properties. For more detail on interfaces in a type library, refer to FIG. 8. In step 306 the property browser also determines the top level properties that are sub-objects, i.e., the top-level properties which themselves have properties.

Another method of determining the top level properties of the ActiveX control may be to find the interface ID of sub-objects by examining the GetTypeInfo method of the interface IDispatch for each sub-object. This method works if the GetTypeInfo method was implemented for the ActiveX control. There is not a requirement for the GetTypeInfo method to be implemented. However, the interface ID may always be found in the type library of the ActiveX control. Thus the type library may be relied upon as a source for the interface ID. Once the interface ID is found, the next step is to find the definition of the interface. Typically, the definition of the interfaces of sub-objects of the ActiveX control are in the same type library as the ActiveX control. When the definition of the interfaces of sub-objects of the ActiveX control are not found in the same type library as the ActiveX control, then the property browser may search the system registry to find the type library of the interface needed.

In step 308 the property browser displays the top level properties of the top level interface, along with the values of those properties. According to one embodiment, top level properties which are objects have the term "(Object)" displayed as their value.

In step 310 the property browser displays an indicator (e.g., a '+' sign) next to properties which are sub-objects. The indicator, when selected, may expand the sub-object property, thereby displaying all of the child properties of the sub-object property. A user may then select an indicator of a sub-object property, for purposes of manipulating the values of the child properties of the sub-object property. It is noted that a child property of a sub-object property may also be yet another sub-object property. Such a child property would display an indicator, which when selected may expand the child sub-object property, thereby displaying all of the child properties of the child sub-object property. Therefore, sub-object properties may be expanded an arbitrary number of levels deep.

FIG. 7 is a flowchart illustrating operation of the property browser when a user selects a property which is a sub-object according to one embodiment of the present invention.

In step 322 a user selects an indicator which is next to a sub-object property, thereby displaying the child properties of the sub-object property.

In step 324 the property browser reads the interfaces of the type library of the sub-object property in response to the user selection.

In step 326 the property browser determines and displays the top level properties of the sub-object property in response to the reading of the interfaces of the type library of the sub-object property. Additionally, a top level property of the sub-object property that is itself also a sub-object property has an interface in the type library which exposes its properties. The property browser displays an indicator (i.e., a '+' sign) next to properties which are sub-objects, as described in FIG. 6. The user may then edit the top-level properties of the sub-object property.

FIG. 8 shows pseudo-IDL (interface definition language) which is used to illustrate interfaces in a type library. The information stored in a type library is stored in binary form and is accessed by use of specific COM APIs (Component Object Model Application Program Interfaces). Interfaces are by convention named with an 'I' being prefixed to the name of the ActiveX control. For example, a CWSlide ActiveX control has an interface named ICWSlide. This ICWSlide interface exposes the properties displayed by the CWSlide ActiveX control at the top level. Top level properties may be objects themselves (sub-objects) that implement an interface.

Block 802 illustrates pseudo-IDL code for the ICWSlide interface. It is noted that the ICWSlide interface includes a property which is itself an object, that is an Axis property that has as its type an interface, namely: ICWAxis. The other properties noted in the ICWSlide interface are of types long, string, and boolean, respectively.

Block 804 illustrates pseudo-IDL code for the ICWAxis interface. It is noted that. the ICWAxis interface also includes a property which is itself an object, that is a Labels property that has as its type an interface, namely: ICWLabels. The other properties noted in the ICWAxis interface are of types Boolean, string, and Boolean, respectively.

In the case where a sub-object has a property that refers to the sub-object's parent, the potential for an endless loop may occur. For example, if the ICWAxis interface included a property for its parent, that property would be named Slide and it would have as its type an interface, namely: ICWSlide. In this case, full expansion of every sub-object of the ICWAxis would cause the two interfaces ICWLabels and ICWSlide to be expanded. The expansion of ICWSlide would cause an endless loop to occur as its expansion would cause another ICWAxis to be expanded, which would cause another ICWSlide to be expanded, and so on. To avoid this circular dependency, the properties of a sub-object (i.e., ICWAxis) which are themselves sub-objects may be expanded on demand (e.g., when they are selected) rather than when the higher-level sub-object (ICWAxis, in this example) is expanded. In this way, arbitrarily deep levels of sub-objects do not cause endless loops and memory is allocated for properties only when the user chooses to edit them.

Another potential pitfall is the case where the ActiveX control comprising the sub-object property being edited no longer exists. The property browser may not be notified when the ActiveX control and/or sub-objects of the ActiveX control are deleted. Therefore it is possible that the user may be actively editing an object that has been deleted or destroyed. Because the user has the capability to delete the ActiveX control and/or sub-objects of the ActiveX control for which active edit sessions on the properties may exist, the property browser preferably checks if the sub-object is still valid before saving the changes made by the user to the sub-object properties. One method of checking validity of a sub-object is by tracing the path from the sub-object to the root of the ActiveX control. Consider the example of a user editing the Autoscale property of the Axis sub-object of the CWSlide ActiveX control shown in FIG. 8. If the Axis sub-object is deleted while the edit session of the Autoscale property is active, and the property browser does not check for the existence of the parent (i.e., the Axis sub-object) upon the user saving the changes made to the Autoscale property, there will not be a location for the Autoscale property changes to be stored. One method to avoid this problem is to first check if the parent of the property being changed (i.e., the Axis sub-object) is the same as it was the last time such a check was made. If not then the next higher level parent (i.e., the CWSlide ActiveX control) is checked. In this case, the top level control (CWSlide) was reached in two steps. It is noted that a more complex example may require many steps of checking the next higher level parent before reaching the top level control. At any point in this checking of the next higher level parent at which a parent that has not changed is reached, then the child objects of that unchanged parent are refreshed. In this way the user is always editing a valid object. If the object has been deleted, then the property browser gives a visual indication that the properties being edited are invalid. One method of doing this is to gray out the properties and disable editing them.

Figure 9:
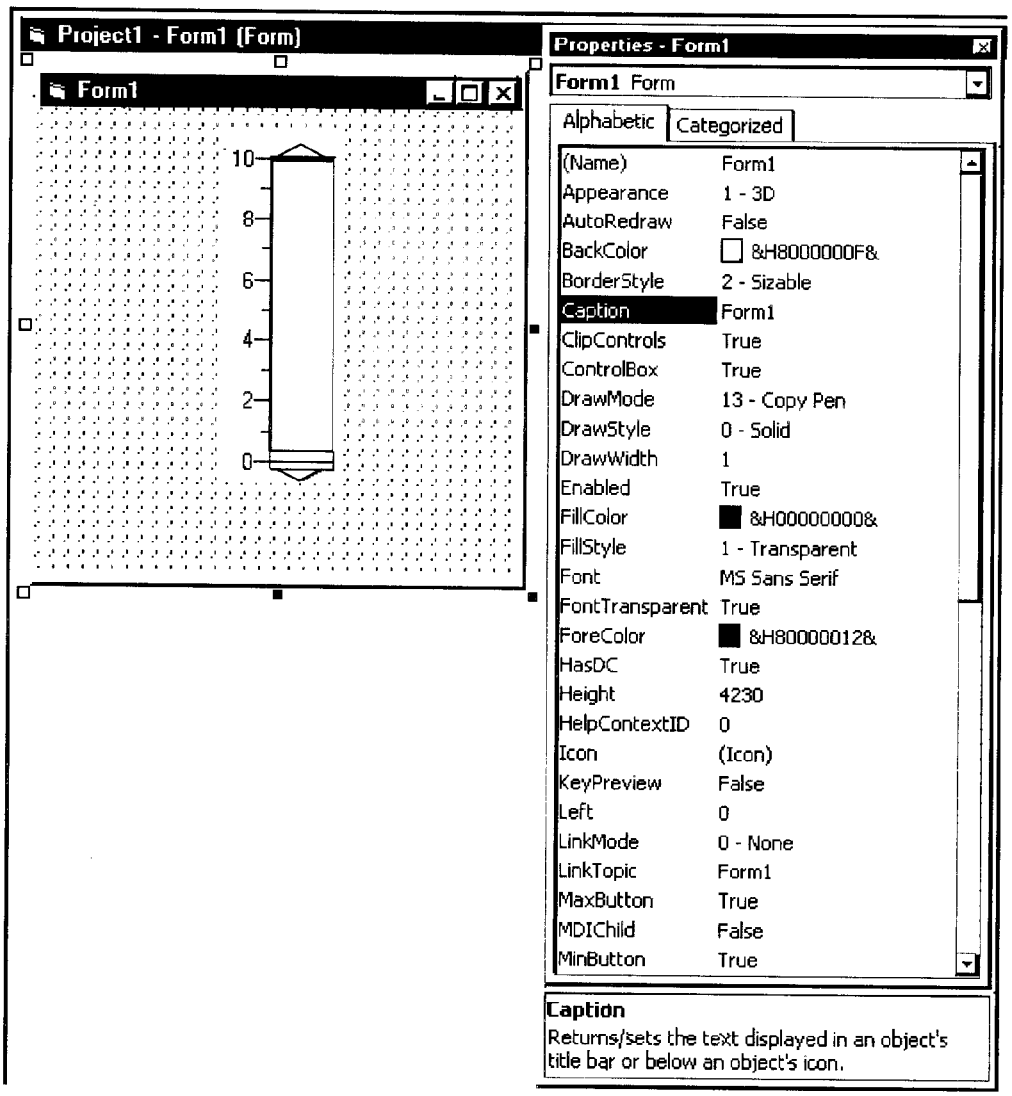
FIG. 9 is a screen shot showing a CWSlide object being edited according to the prior art.

FIG. 9 is a screen shot of the property browser editing the properties of a CWSlide object, which is a Component-Works control. The CWSlide object has an Axis property that is a sub-object. Notice the property browser does not display it.

Figure 10:
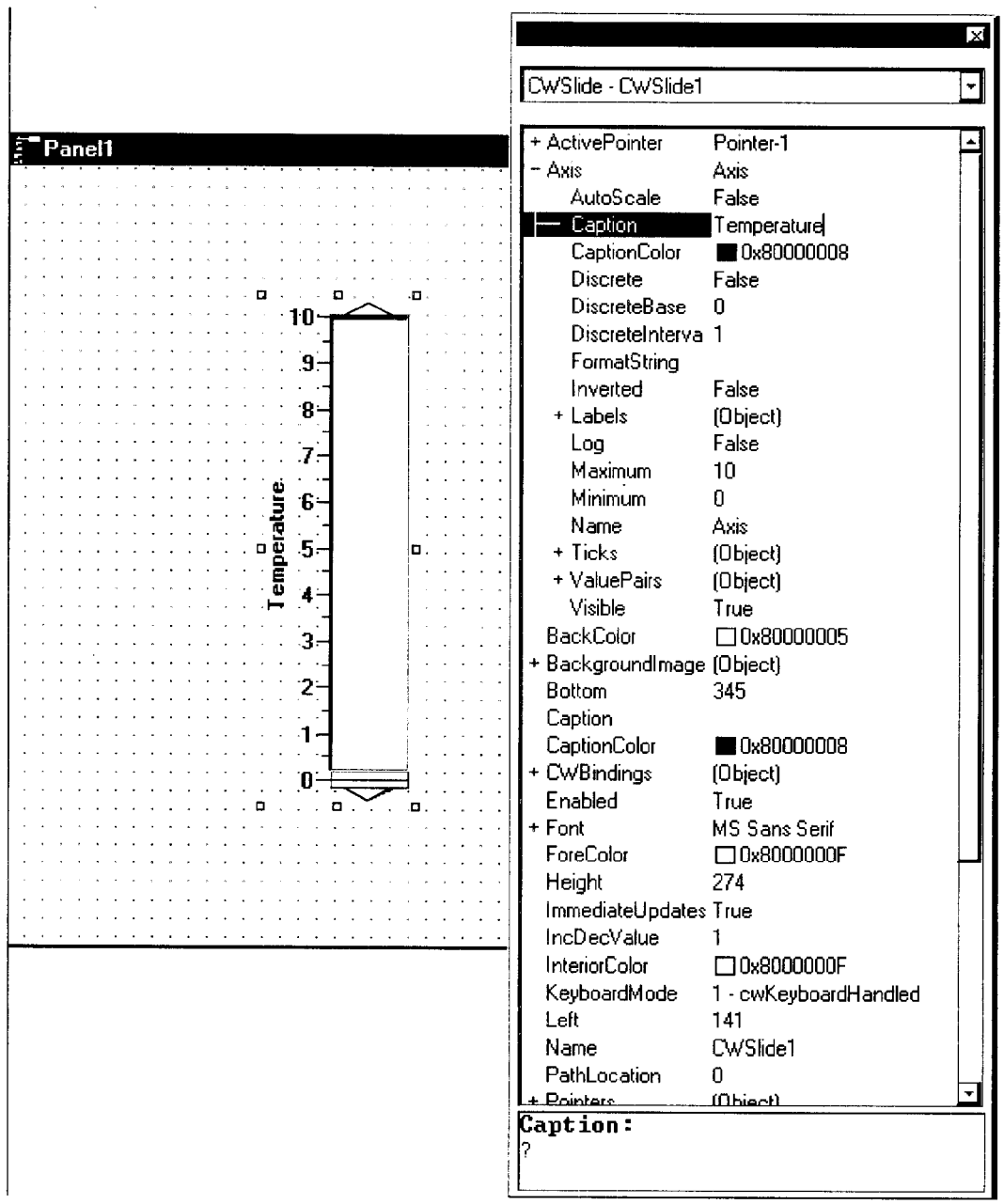
FIG. 10 is a screen shot showing a CWSlide object being edited according to the present invention.

FIG. 10 is a screen shot of the property browser editing the properties of a CWSlide object, according to one embodiment of the present invention. The property browser displays the Axis sub-object property. The Axis sub-object property has an indicator (i.e., a "−" sign) next to it. The minus sign indicates that the Axis sub-object property is expanded; conversely, if the indicator was a plus ("+") sign, that indicates that the Axis sub-object property is collapsed. The child objects of the Axis sub-object property are shown, namely: AutoScale, Caption, CaptionColor, Discrete, DiscreteBase, DiscreteInterval, FormatString, Inverted, Labels, Log, Maximum, Minimum, Name, Ticks, ValuePairs, and Visible. Of these child objects of the Axis sub-object property, the following are themselves sub-objects (indicated by the "+" sign next to each): Labels, Ticks, and ValuePairs. The ability to modify the Caption child property of the Axis sub-object property is demonstrated here. The user types the value (i.e., "Temperature") in the property browser window, and the value ("Temperature") appears on the CWSlide object.

Without the present invention, the user is limited to setting sub-object properties in code at run time. This is both time-consuming and error-prone. The present invention provides the convenience for the user to be able to view and set sub-object properties visually in the property browser at design time. In order to access sub-object properties at design time without the use of the present invention, a control implementor would be required to implement property pages to access each individual property the user desires to set.

By complying with the ActiveX control standard, the controls of the present invention advantageously provide a container independent set of controls which may be edited in the manner disclosed herein. The container independent feature of the controls alleviates the development time which would otherwise be required to use the controls in each desired container. The controls can advantageously be used in any container which supports the ActiveX control specification. Although the preferred embodiment of the present invention conforms to the Microsoft ActiveX control standard, the methods described herein may be applied to other similar standards for developing reusable user interface components which utilize a type library interface or similar kind of interface.

Although the invention has been described for graphical controls, the invention contemplates non-graphical controls which employ the methods described. Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer-implemented method for manipulating ActiveX controls in a computer system, comprising:
   displaying the ActiveX control, wherein the ActiveX control includes a type library;
   reading interfaces of the type library of the ActiveX control;
   determining a top level interface of the ActiveX control in response to said reading; and
   displaying top level properties of the top level interface;
   wherein a user is able to select and manipulate properties which are sub-objects.

2. The method of claim 1, further comprising:
   displaying an indicator of properties which are sub-objects.

3. The method of claim 2, wherein displaying an indicator of properties which are sub-objects further comprises:
   determining a type for each top level property of the top level interface, wherein the type is object or non-object;
   displaying an indicator next to each top level property that is an object type to indicate that the top level property has properties of its own.

4. The method of claim 1, further comprising:
   selecting a sub-object property in response to user input;
   reading an interface of the sub-object property from the type library;
   displaying top level properties of the interface of the sub-object property;
   wherein a user is able to select and manipulate the top level properties of the interface of the sub-object property.

5. The method of claim 4, further comprising:
   creating a tree structure with properties and values queried from the ActiveX control using the top level interface of the ActiveX control; and
   creating a lookup table for object properties by traversing the tree structure.

6. The method of claim 4, wherein the computer system includes:
   a property browser which maintains one or more instances of an ActiveX control; and
   a TypeLib manager which maintains information for one or more interfaces;
   wherein displaying top level properties of the interface of the sub-object property further comprises the property browser looking up the interface of the sub-object property in the TypeLib manager to retrieve the properties of the sub-object property.

7. The method of claim 6, wherein the property browser displays a single ActiveX control at a time.

8. The method of claim 4, wherein the properties of the sub-object property comprise one or more sub-object properties.

9. The method of claim 8, further comprising manipulating sub-object property information only after checking that the ActiveX control comprising the sub-object property remains the same as it was prior to the manipulation.

10. The method of claim 9, wherein manipulating sub-object property information further comprises reading sub-object property information.

11. The method of claim 9, wherein manipulating sub-object property information further comprises writing sub-object property information.

12. A computer system for manipulating ActiveX controls, the computer system comprising:
   a display;
   an input device;
   a memory which stores a software program for manipulating ActiveX controls;
   a CPU coupled to the memory, the display and the input device, wherein the CPU is operable to execute the software program in the memory, wherein, in executing the software program, the CPU is operable to:
      display the ActiveX control, wherein the ActiveX control includes a type library;
      read interfaces of the type library of the ActiveX control;
      determine a top level interface of the ActiveX control in response to said reading; and
      display top level properties of the top level interface;
   wherein a user is able to select and manipulate properties which are sub-objects.

13. The system of claim 12, wherein, in executing the software program, the CPU is further operable to:
   display an indicator of properties which are sub-objects.

14. The system of claim 13, wherein in displaying an indicator of properties which are sub-objects, the CPU is further operable to:
   determine a type for each top level property of the top level interface, wherein the type is object or non-object;
   display an indicator next to each top level property that is an object type to indicate that the top level property has properties of its own.

15. The system of claim 12, wherein, in executing the software program, the CPU is further operable to:
   select a sub-object property in response to user input;
   read an interface of the sub-object property from the type library;
   display top level properties of the interface of the sub-object property;
   wherein a user is able to select and manipulate the top level properties of the interface of the sub-object property.

16. A carrier medium which stores program instructions, wherein the program instructions are executable to implement:
   displaying the ActiveX control, wherein the ActiveX control includes a type library;
   reading interfaces of the type library of the ActiveX control;
   determining a top level interface of the ActiveX control in response to said reading; and
   displaying top level properties of the top level interface;
   wherein a user is able to select and manipulate properties which are sub-objects.

17. The carrier medium of claim 16, wherein the program instructions are further executable to implement:
   displaying an indicator of properties which are sub-objects.

18. The carrier medium of claim 17, wherein in displaying an indicator of properties which are sub-objects, the program instructions are further executable to implement:
  determining a type for each top level property of the top level interface, wherein the type is object or non-object;
  displaying an indicator next to each top level property that is an object type to indicate that the top level property has properties of its own.

19. The carrier medium of claim 16, wherein the program instructions are further executable to implement:
  selecting a sub-object property in response to user input;
  reading an interface of the sub-object property from the type library;
  displaying top level properties of the interface of the sub-object property;
  wherein a user is able to select and manipulate the top level properties of the interface of the sub-object property.

20. The carrier medium of claim 16, wherein the carrier medium is a memory medium.

21. A computer-implemented method for manipulating controls in a computer system, comprising:
  displaying the control, wherein the control includes a type library;
  reading interfaces of the type library of the control;
  determining a top level interface of the control in response to said reading; and
  displaying top level properties of the top level interface;
  wherein a user is able to select and manipulate properties which are sub-objects.

22. The method of claim 21, further comprising:
  displaying an indicator of properties which are sub-objects.

23. The method of claim 22, wherein displaying an indicator of properties which are sub-objects further comprises:
  determining a type for each top level property of the top level interface, wherein the type is object or non-object;
  displaying an indicator next to each top level property that is an object type to indicate that the top level property has properties of its own.

24. The method of claim 21, further comprising:
  selecting a sub-object property in response to user input;
  reading an interface of the sub-object property from the type library;
  displaying top level properties of the interface of the sub-object property;
  wherein a user is able to select and manipulate the top level properties of the interface of the sub-object property.

25. The method of claim 24, further comprising:
  creating a tree structure with properties and values queried from the control using the top level interface of the control; and
  creating a lookup table for object properties by traversing the tree structure.

26. The method of claim 24, wherein the computer system includes:
  a property browser which maintains one or more instances of an control; and
  a TypeLib manager which maintains information for one or more interfaces;
  wherein displaying top level properties of the interface of the sub-object property further comprises the property browser looking up the interface of the sub-object property in the TypeLib manager to retrieve the properties of the sub-object property.

27. The method of claim 26, wherein the property browser displays a single control at a time.

28. The method of claim 24, wherein the properties of the sub-object property comprise one or more sub-object properties.

29. The method of claim 28, further comprising manipulating sub-object property information only after checking that the control comprising the sub-object property remains the same as it was prior to the manipulation.

30. The method of claim 29, wherein manipulating sub-object property information further comprises reading sub-object property information.

31. The method of claim 29, wherein manipulating sub-object property information further comprises writing sub-object property information.

32. A computer system for manipulating controls, the computer system comprising:
  a display;
  an input device;
  a memory which stores a software program for manipulating controls;
  a CPU coupled to the memory, the display and the input device, wherein the CPU is operable to execute the software program in the memory, wherein, in executing the software program, the CPU is operable to:
    display the control, wherein the control includes a type library;
    read interfaces of the type library of the control;
    determine a top level interface of the control in response to said reading; and
    display top level properties of the top level interface;
  wherein a user is able to select and manipulate properties which are sub-objects.

33. The system of claim 32, wherein, in executing the software program, the CPU is further operable to:
  display an indicator of properties which are sub-objects.

34. The system of claim 33, wherein in displaying an indicator of properties which are sub-objects, the CPU is further operable to:
  determine a type for each top level property of the top level interface, wherein the type is object or non-object;
  display an indicator next to each top level property that is an object type to indicate that the top level property has properties of its own.

35. The system of claim 32, wherein, in executing the software program, the CPU is further operable to:
  select a sub-object property in response to user input;
  read an interface of the sub-object property from the type library;
  display top level properties of the interface of the sub-object property;
  wherein a user is able to select and manipulate the top level properties of the interface of the sub-object property.

36. A carrier medium which stores program instructions, wherein the program instructions are executable to implement:
  displaying the control, wherein the control includes a type library;
  reading interfaces of the type library of the control;
  determining a top level interface of the control in response to said reading; and displaying top level properties of the top level interface;

wherein a user is able to select and manipulate properties which are sub-objects.

37. The carrier medium of claim 36, wherein the program instructions are further executable to implement:

displaying an indicator of properties which are sub-objects.

38. The carrier medium of claim 37, wherein in displaying an indicator of properties which are sub-objects, the program instructions are further executable to implement:

determining a type for each top level property of the top level interface, wherein the type is object or non-object;

displaying an indicator next to each top level property that is an object type to indicate that the top level property has properties of its own.

39. The carrier medium of claim 36, wherein the program instructions are further executable to implement:

selecting a sub-object property in response to user input;

reading an interface of the sub-object property from the type library;

displaying top level properties of the interface of the sub-object property;

wherein a user is able to select and manipulate the top level properties of the interface of the sub-object property.

40. The carrier medium of claim 36, wherein the carrier medium is a memory medium.

* * * * *